United States Patent [19]

Poll et al.

[11] Patent Number: 5,196,505
[45] Date of Patent: Mar. 23, 1993

[54] PROCESS FOR THE PREPARATION OF A THERMOPLASTICALLY PROCESSABLE AROMATIC POLYAMIDE WITH PHOSPHORUS ACID CATALYST

[75] Inventors: Günter Poll; Jürgen Finke, both of Marl, Fed. Rep. of Germany

[73] Assignee: Huels Aktiengesellschaft, Marl, Fed. Rep. of Germany

[21] Appl. No.: 623,680

[22] Filed: Dec. 6, 1990

[30] Foreign Application Priority Data

Dec. 23, 1989 [DE] Fed. Rep. of Germany ....... 3942941

[51] Int. Cl.$^5$ ............................................. C08G 69/28
[52] U.S. Cl. .................................... 528/336; 528/125; 528/126; 528/128; 528/171; 528/172; 528/173; 528/179; 528/183; 528/185; 528/190; 528/337; 528/344; 528/348
[58] Field of Search ............... 528/336, 182, 126, 173, 528/337, 190, 179, 125, 171, 183, 348

[56] References Cited

U.S. PATENT DOCUMENTS

| | | | |
|---|---|---|---|
| 4,621,134 | 11/1986 | Aritomi et al. | 528/336 |
| 4,720,538 | 1/1988 | Bartmann | 528/336 |
| 4,727,130 | 2/1988 | Bartmann | 528/336 |
| 4,749,768 | 6/1988 | Finke et al. | 528/336 |

OTHER PUBLICATIONS

Gefter, Organophosphorus Monomers And Polymers (1962), pp. X–XIII
Hackh's Chemical Dictionary, Fourth Edition, 1969 (1972), p. 514.

*Primary Examiner*—Harold D. Anderson
*Attorney, Agent, or Firm*—Oblon, Spivak, McClelland, Maier & Neustadt

[57] ABSTRACT

A thermoplastically processable aromatic polyamide is prepared by polycondensing diacid monomer A with diamine monomer B: (A) HOOC—Ar—COOH; (B) H$_2$N—Ar'—NH$_2$; wherein Ar is 1,3— or 1,4-phenylene; 1,4—, 1,5—, 2,6— or 2,7-naphthylene,

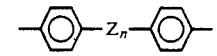

or

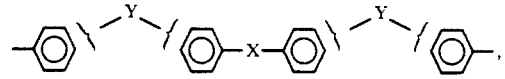

and Ar' is

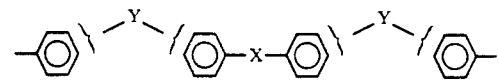

wherein X is —SO$_2$— or —CO—; Y is —O— or —S—; Z is —O—, —S—, —SO$_2$—, —CO— or

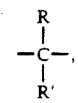

wherein R and R' each is —H or C$_1$— to C$_4$-alkyl and n is 0 or 1 in the melt at a temperature in the range of from 200° to 400° C. in the presence of a catalyst selected from the group consisting of alkyl- or aryl-phosphonic acids, -phosphonous acids, -phosphinic acids, esters thereof, halides thereof and mixtures thereof, the catalyst content being 0.01 to 2.0 mol % relative to the total content of components A and B.

3 Claims, No Drawings

PROCESS FOR THE PREPARATION OF A THERMOPLASTICALLY PROCESSABLE AROMATIC POLYAMIDE WITH PHOSPHORUS ACID CATALYST

BACKGROUND OF THE INVENTION

1. Field of the Invention

The present invention relates to a process for the preparation of a thermoplastically processable aromatic polyamide.

2. Description of the Background

In principle, the preparation of thermoplastically processable aromatic polyamides are known (see, for example, DE-A-3,609, 011; Brode et al., Polym. Prepr., Am. Chem. Soc., Div. Polym. Chem. 15, 761 (1974); Adv. Chem. Ser. (1975), 142; CA 84, 5530 sf). However, these aromatic polyamides have a high melt viscosity. Consequently, very high temperatures are necessary during their preparation and processing, usually at least 350° C. At these temperatures, damage to the product is often observed, recognizable from discolorations or an impairment of the mechanical properties.

Aromatic polyamides are used as high temperature resistant materials in the aerospace, automobile, electrical and electronics industry, where they are exposed to temperatures in the region of 200° C. and above in the presence of atmospheric oxygen. Under these conditions, discoloration of the product readily occurs with simultaneous diminution of the mechanical properties.

There have already been many attempts to redress these deficiencies. In particular, it has been proposed to carry out the polycondensation of the aromatic dicarboxylic acids and aromatic diamines in the presence of triphenyl phosphite or of an acid which has been derived from phosphorus having the formula: $H_3PO_m$, where m is 2, 3 or 4 as catalyst and of a dialkylaminopyridine as cocatalyst (DE-A-3,539,846, 3,601,011, 3,609,011, 3,731,185, and German Patent Application number P 39 35 466.0). However, the resulting polyamides cannot always completely satisfy the prescribed requirements. A need therefore continues to exist for aromatic polyamides of improved properties.

SUMMARY OF THE INVENTION

Accordingly, one object of the present invention is to provide molding compositions based on aromatic polyamides which exhibit improved heat stability.

Briefly, this object and other objects of the present invention as hereinafter will become more readily apparent can be attained in a process for preparing a polyamide by polycondensing the monomers:

HOOC—Ar—COOH     A

H₂N—Ar'—NH₂     B wherein Ar is 1,3- or 1,4-phenylene; 1,4-, 1,5-, 2,6- or 2,7-naphthylene,

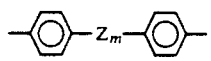

or

wherein:
X is —SO₂— or —CO—;
Y is —O— or —S—;
Z is —O—, —S—, —SO₂—, —CO— or

wherein
R and R' each is —H or C₁— to C₄-alkyl; and n is 0 or 1, in the melt at a temperature in the range of from 200° to 400° C. in the presence of a catalyst of an alkyl- or aryl-phosphonic acid, -phosphonous acid, -phosphinic acid, ester thereof, halide thereof or combinations thereof in an amount of 0.01 to 2.0 mole % relative to the content of monomers A and B.

Suitable aromatic dicarboxylic acids (component A) include isophthalic acid, terephthalic acid, 1,4-, 1,5-, 2,6-and 2,7-naphthalenedicarboxylic acid, 4,4'-diphenyl ether dicarboxylic acid or 4,4'-benzophenonedicarboxylic acid, 4,4'-diphenyl sulfone dicarboxylic acid, 4,4'-biphenyl-dicarboxylic acid and mixtures thereof. Isophthalic acid and terephthalic acid may be substituted on the phenylene group by alkoxy, aryloxy or alkyl groups. An example of a suitable acid of this type is 2-phenoxyterephthalic acid.

Examples of suitable aromatic diamines (component B) include 4,4'-bis(p-aminophenoxy)diphenyl sulfone, 4,4'-bis(m-aminopheloxy)diphenyl sulfone, 4,4'-bis(p-aminophenoxy)-benzophenone, 4,4'-bis(m-aminophenoxy)benzophenone, 4,4'-bis(p-aminophenylmercapto)benzophenone, 4,4'-bis(p-aminophenylmercapto)diphenyl sulfone and mixtures thereof.

The components A and B are usually reacted together in approximately equimolar quantities.

The molecular weight of the polyamide product can be regulated by adding, as component C, aromatic monocarboxylic acids (see German Patent Application P 39 35 468.7) or aromatic carboxamides of the formula given below to the reaction medium. These additions are generally 0.01 to 10, preferably 0.05 to 5 mol %, relative to the total of components A and B.

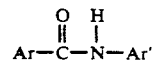

In the above formula, Ar and Ar' are optionally substituted phenyl radicals. Examples of suitable molecular weight regulators are benzanilide, 4-chlorobenzoic acid anilide, tolylanilide, 4-(p-benzoylamidophenoxy)-4'-phenoxy-diphenyl sulfone and 2-naphthalenecarboxylic acid anilide.

The molecular weight of the polyamide can also be regulated by using aromatic carboxylic acids such as, for example, benzoic acid, naphthalenecarboxylic acid, chlorobenzoic acid and/or aliphatic carboxylic acids having 1 to 20 carbon atoms, on the one hand mixed with aromatic amines such as, for example, aniline, chloroaniline, naphthylamine, 4-(p-aminophenoxy)-diphenyl sulfone, and/or, on the other hand, with aliphatic amines having 4 to 20 carbon atoms. In these mixtures, carboxylic acid and amine are preferably used in equimolar amounts (see DE-A-3,804,401).

Finally, it is also possible to regulate the molecular weight by using the component A in excess (see German Patent Application P 39 35 467.9).

The catalysts used are preferably compounds of the following formulae:

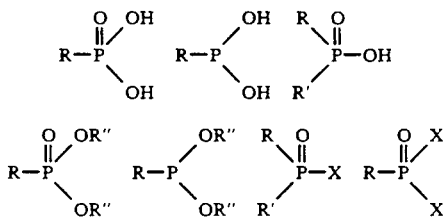

In these formulae,
R, R' and R'', independently of one another, are phenyl, 1- or 2-naphthyl, 2-, 3- or 4-chlorophenyl, 2-, 3- or 4-tolyl, $C_1$- to $C_{20}$-alkyl or -cycloalkyl; and
X is Cl or Br.

The polycondensation reaction is preferably carried out in the presence of a catalyst and additionally in the presence of a cocatalyst selected from the group of pyridines having at least one nucelophilic substituent, tin(II) compounds, and mixtures thereof. The catalyst and cocatalyst contents each range from 0.01 to 2.0, preferably 0.02 to 1.0 mol %, relative to the total of components A and B.

The relative proportions of catalyst and cocatalyst can be selected as desired within the above-mentioned limits. Preferably, the phosphorus compound and the substituted pyridine are used in the molar ratio of 1:1, the phosphorus compound and the tin(II) compound in the molar ratio of 1:1 to 2:1, and the phosphorus compound, the substituted pyridine and the tin(II) compound in the molar ratio of 1:1:1 to 1:1:0.5.

The substituted pyridines are preferably compounds of the formula:

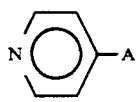

In this formula,

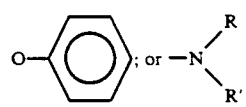

where R and R' are $C_1$- to $C_{20}$-alkyl or -cycloalkyl.

The tin(II) compounds are preferably salts of organic mono- or di-carboxylic acids having 2 to 16 carbon atoms in the carbon skeleton such as, for example, tin dioctanoate, tin dilaurate, tin dodecanedioate and tin oxalate, and also tin alcoholates such as, for example, tin glycolate.

Surprisingly, it has been found that the catalysts and the catalyst/cocatalyst combinations employed in the present process are clearly superior to conventional catalysts with regard to activity. The polyamides which have been prepared by the process of the invention have a significantly improved heat stability so that they can be processed at temperatures above 340° C. without damage, i.e. without darkening and without reduction in the molecular weight. During this processing, the solution viscosity, which is a measure of the molecular weight, does not diminish. Injection-molded test specimens from a polyamide which has been prepared according to the process disclosed in DE-A-3,609,011 developed an intense brown coloration after storage for only 24 h at 200° C. in air. In contrast, a test specimen from a comparable polyamide according to the present invention remained unchanged under corresponding test conditions.

Having generally described this invention, a further understanding can be obtained by reference to certain specific examples which are provided herein for purposes of illustration only and are not intended to be limiting unless otherwise specified.

The comparative examples, not according to the invention, are indicated by capital letters.

The viscosity numbers (J) were determined using 0.5 % by weight solutions of the polyamides in a phenol/o-dichlorobenzene mixture (ratio by weight i:1) at 25° C. in accordance with DIN 53 728.

EXAMPLE 1

A 21.62 g (0.05 mol) amount of 4,4'-bis(p-aminophenoxy)diphenyl sulfone and 8.64 g (0.052 mol) of isophthalic acid were melted at 250° C. together with 48 mg (0.0005 mol) of methylphosphonic acid (K1) in a polycondensation reactor fitted with a stirrer, a nitrogen feed and a distillation arm. After 20 minutes, the temperature was increased to 300° C. Meanwhile, the viscosity of the melt steadily increased and the water liberated during the reaction was removed by distillation. After 30 minutes at 300° C., the reaction was terminated.

The viscosity number (J) was 28 cm³/g. Solid phase postcondensation at 250° C. and 0.5 mbar gave, after 24 h, a polyamide having J = 71 cm³/g.

EXAMPLES 2 TO 15 AND COMPARATIVE EXAMPLES A AND B

Examples 2 to 15 and the Comparative Examples A and B were carried out similarly to Example 1, but the catalysts were varied as shown in the Table below. The catalysts (K) and cocatalysts (CP and CZ) used correspond to the formulae as follows:

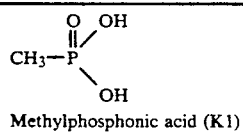
Methylphosphonic acid (K1)

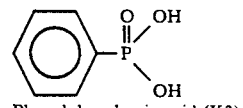
Phenylphosphonic acid (K2)

-continued

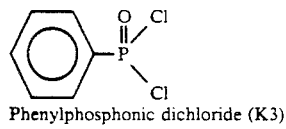
Phenylphosphonic dichloride (K3)

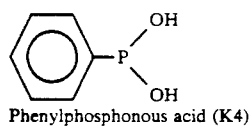
Phenylphosphonous acid (K4)

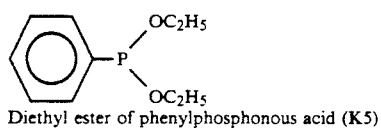
Diethyl ester of phenylphosphonous acid (K5)

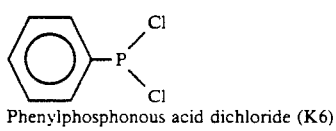
Phenylphosphonous acid dichloride (K6)

Diphenylphosphonic acid (K7)

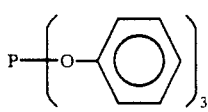
Triphenyl phosphate (TPP)

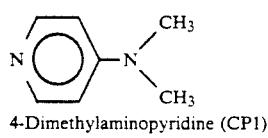
4-Dimethylaminopyridine (CP1)

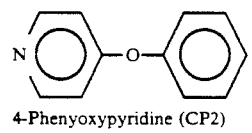
4-Phenyoxypyridine (CP2)

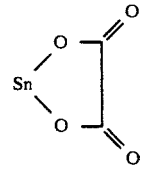
Tin oxalate (CZ)

| Example | (Co) catalysts K | CP | CZ | Mol % K | CP | CZ | J [cm³/g] | J* [cm³/g] |
|---|---|---|---|---|---|---|---|---|
| 1 | K1 | — | — | 1.0 | — | — | 28 | 71 |
| 2 | K2 | — | — | 0.6 | — | — | 34 | 86 |
| 3 | K4 | — | — | 1.0 | — | — | 27 | 68 |
| 4 | K7 | — | — | 1.0 | — | — | 30 | 78 |
| 5 | K3 | — | — | 0.5 | — | — | 38 | 81 |
| 6 | K5 | — | — | 0.5 | — | — | 26 | 69 |
| 7 | K6 | — | — | 0.5 | — | — | 31 | 75 |
| 8 | K1 | CP1 | — | 0.5 | 0.5 | — | 30 | 104 |
| 9 | K1 | CP1 | CZ | 0.5 | 0.5 | 0.5 | 30 | 88 |
| 10 | K2 | CP1 | — | 0.2 | 0.2 | — | 30 | 78 |
| 11 | K2 | — | CZ | 0.5 | — | 0.25 | 26 | 104 |
| 12 | K4 | CP2 | — | 0.5 | 0.5 | — | 36 | 84 |
| 13 | K7 | CP1 | CZ | 1.0 | 1.0 | 1.0 | 40 | 96 |
| 14 | K3 | CP1 | — | 0.5 | 0.5 | — | 37 | 82 |
| 15 | K5 | — | CZ | 0.5 | — | 0.5 | 29 | 75 |
| A | TPP | — | — | 1.0 | — | — | 26 | 58 |
| B | H₃PO₃ | — | — | 1.0 | — | — | 24 | 49 |

*after solid phase post-condensation.

The polyamides prepared in Examples 1 to 15 and in Comparative Examples A and B were pressed at 310° C. and a pressure of 100 bar to give sheets of 1-mm thickness and these were stored in a circulating-air oven having a fresh air supply of about 10%, for 24 h at 200° C. The polyamides which had been prepared for comparative purposes were discolored dark brown while the polyamides which had been prepared according to Examples 1 to 15 were virtually unchanged.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the U.S.:

1. A process for the preparation of a thermoplastically processable aromatic polyamide, comprising:
polycondensing diacid monomer A of the formula: HOOC-Ar-COOH, wherein Ar is 1,3- or 1,4-phenylene; 1,4-, 1,5-, 2,6- or 2,7-naphthylene or

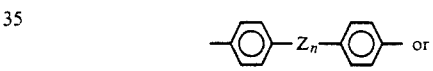 or

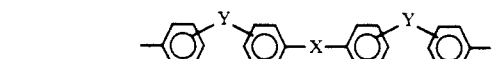, with diamine monomer B of the formula: $H_2N$-Ar'-$NH_2$, wherein Ar' is

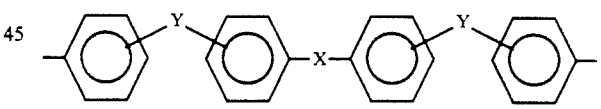

wherein X is —$SO_2$— or —CO—; Y is —O— or —S—; Z is —O—, —S—, —$SO_2$—, —CO— or —CRR'—, wherein R and R' each is hydrogen or $C_{1-4}$-alkyl and n is 0 or 1, in the melt at a temperature in the range of from 200° to 400° C. in the presence of at least one catalyst selected from the group consisting of catalysts of the formula:

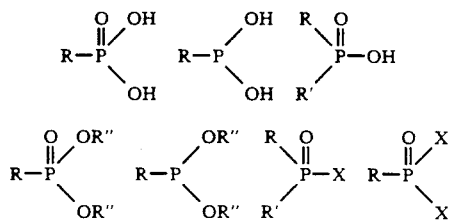

wherein R, R' and R", independently of one another, are phenyl, 1- or 2-naphthyl, 2-, 3- or 4- chlorophenyl, 2-, 3- or 4-tolyl, $C_{1-20}$-alkyl or cycloalkyl and X is chlorine or bromine, the catalyst content ranging from 0.01 to 2.0 mole % relative to the total content of components A and B.

2. The process according to claim 1, wherein said diacid monomer A is isophthalic acid, terephthalic acid, 1,4-, 1,5-, 2,6- or 2,7-naphthalenedicarboxylic acid, 4,4'-diphenyl ether dicarboxylic acid or 4,4'-benzophenonedicarboxylic acid, 4,4'-diphenyl sulfone dicarboxylic acid, 4,4'-biphenyl-dicarboxylic acid or mixtures thereof.

3. The process according to claim 1, wherein said diamine monomer B is 4,4'-bis(p-aminophenoxy)diphenyl sulfone, 4,4'-bis)m-aminophenoxy)diphenyl sulfone, 4,4'-bis(p-aminophenoxy)benzophenone, 4,4'-bis(m-aminophenoxy)benzophenone, 4,4'-bis(p-aminophenylmercapto)benzophenone, 4,4'-bis(p-aminophenylmercapto)sulfone or mixtures thereof.

* * * * *